(12) United States Patent
Yamamoto

(10) Patent No.: US 7,367,329 B2
(45) Date of Patent: May 6, 2008

(54) INTAKE DEVICE FOR ENGINE

(76) Inventor: Toshihiko Yamamoto, 2-2-23 komachi, kamakura, kanagawa 248-0006 (JP)

( * ) Notice: Subject to any disclaimer, the term of this patent is extended or adjusted under 35 U.S.C. 154(b) by 90 days.

(21) Appl. No.: 11/290,255

(22) Filed: Nov. 30, 2005

(65) Prior Publication Data

US 2007/0044780 A1    Mar. 1, 2007

(30) Foreign Application Priority Data

Aug. 24, 2005   (JP)   ............................ 2005-242466

(51) Int. Cl.
*F02M 29/04*    (2006.01)
(52) U.S. Cl. ...................... 123/590; 123/591
(58) Field of Classification Search ............... 123/590, 123/591
See application file for complete search history.

(56) References Cited

U.S. PATENT DOCUMENTS

| | | | | |
|---|---|---|---|---|
| 1,382,285 A | * | 6/1921 | Harris | ......................... 123/556 |
| 1,503,371 A | * | 7/1924 | Meyer | ....................... 48/189.4 |
| 3,459,162 A | * | 8/1969 | Burwinkle et al. | ........ 123/41.1 |
| 4,455,988 A | * | 6/1984 | Zwierzelewski | ............ 123/590 |
| 4,492,212 A | * | 1/1985 | Dooley | ....................... 123/590 |
| 4,569,322 A | * | 2/1986 | Gristina | ...................... 123/547 |
| 4,628,890 A | * | 12/1986 | Freeman | ..................... 123/593 |
| 5,119,794 A | * | 6/1992 | Kushida et al. | ............. 123/549 |
| 5,947,082 A | * | 9/1999 | Choi et al. | ............... 123/339.1 |
| 6,076,499 A | * | 6/2000 | Klumpp | ...................... 123/337 |
| 2001/0032676 A1 | * | 10/2001 | Kuroshita et al. | ..... 137/512.15 |
| 2001/0050075 A1 | * | 12/2001 | Lerner | ........................ 123/593 |

FOREIGN PATENT DOCUMENTS

JP        2000205060 A    *   7/2000

* cited by examiner

*Primary Examiner*—M. McMahon
(74) *Attorney, Agent, or Firm*—Flynn, Thiel, Boutell & Tanis, P.C.

(57) ABSTRACT

An intake device for an engine includes a fuel supply system for supplying fuel to an intake passage and a plurality of plates. The plurality of plates are positioned on an upstream side and a downstream side along a direction of a flow of intake air and arranged at different mounting angles from each other in the intake passage on a downstream side of the fuel supply system. The plurality of plates have a plurality of holes in different sizes.

1 Claim, 15 Drawing Sheets

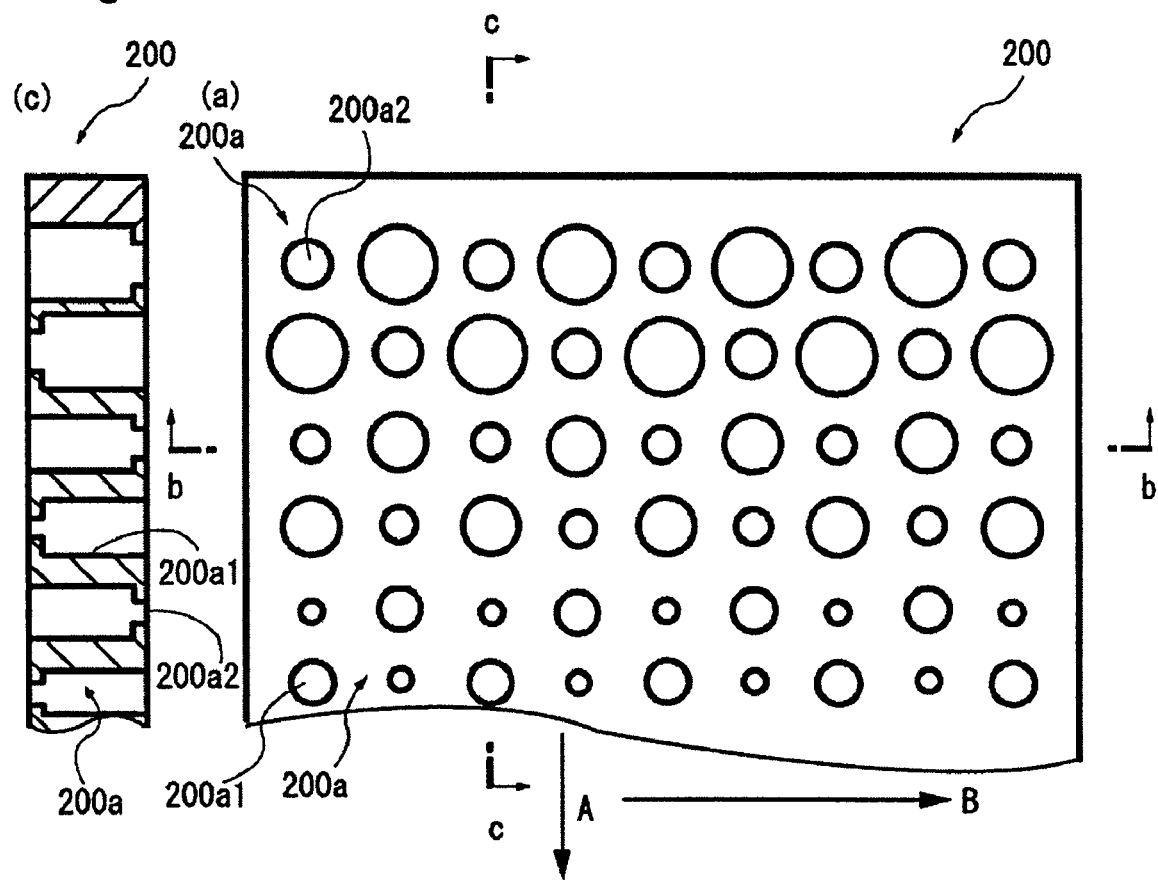
Fig. 7
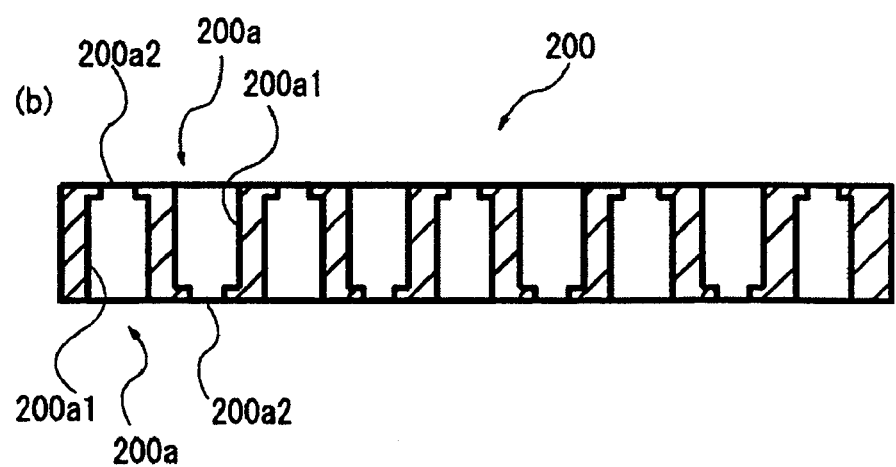

(a)

(b)

INTAKE DEVICE FOR ENGINE

FIELD OF THE INVENTION

The present invention relates to an intake device for an engine including a fuel supply system for supplying fuel to an intake passage.

BACKGROUND OF THE INVENTION

Conventionally, there is a two-cycle engine or a four-cycle engine as an engine mounted on a vehicle such as a two-wheeled motorcycle and each of these engines is provided with an intake device. Some intake devices include fuel supply systems for supplying fuel to intake passages.

A mixture of air and fuel is supplied to such an intake device. Some intake devices include straightening plates disposed in intake passages in order to improve filling efficiency of the air-fuel mixture. However, straightening of the air-fuel mixture by using the straightening plate is not sufficient to atomize the air-fuel mixture and reduce harmful components in exhaust gas to ideal degrees.

SUMMARY OF THE INVENTION

The present invention has been made with the above circumstances in view and it is an object to provide an intake device for an engine, with which an atomization ratio of air-fuel mixture, combustion efficiency and fuel consumption can be improved and harmful components in exhaust gas can be reduced.

To solve the above problems and achieve the object, the present invention has the following structure.

According to the first embodiment of the invention, there is provided an intake device for an engine, the device comprising a fuel supply system for supplying fuel to an intake passage, wherein a plate having a plurality of holes is disposed along a direction of a flow of intake air in the intake passage on a downstream side of the fuel supply system and the plurality of holes are in different sizes.

The fuel supplied by the fuel supply system is mixed with air. The plate having the plurality of holes in different sizes further facilitates turbulence to perform atomization. The air-fuel mixture atomized in two steps is supplied to thereby improve the combustion efficiency and fuel economy. Furthermore, a fuel component in the atomized air-fuel mixture remains as liquid drops in the holes in the plurality of plates and the residual air-fuel mixture is supplied during the next intake stroke to thereby further improve the combustion efficiency and reduce harmful components in the exhaust gas.

With the plate, a velocity of the flow of the intake air is not reduced irrespective of a mounting orientation of the intake passage to thereby further improve an atomization ratio of the air-fuel mixture, combustion efficiency and fuel economy, and to reduce harmful components in the exhaust gas.

The fuel supplied by the fuel supply system is mixed with air. The plates having the plurality of holes in different sizes further facilitate turbulence to atomize the mixture and prevent blowing back. As a result, the fuel component in the air-fuel mixture remains as liquid drops in the holes of the plates and the residual air-fuel mixture is supplied during the next intake stroke. The air-fuel mixture atomized in the two steps is supplied to thereby improve the combustion efficiency and the fuel consumption, and to reduce harmful components in the exhaust gas.

According to the second embodiment of the invention, a plurality of holes in different sizes are arranged along the direction of the flow of the intake air. The plurality of holes in different sizes and arranged along the direction of the flow of the intake air further facilitate turbulence to perform atomization.

According to the third embodiment of the invention, a plurality of holes in different sizes are arranged along a direction orthogonal to the direction of the flow of the intake air. The plurality of holes in different sizes and arranged along the direction orthogonal to the direction of the flow of the intake air further facilitate turbulence to perform atomization.

According to the fourth embodiment of the invention, a plurality of holes in different sizes are arranged along the direction of the flow of the intake air and arranged along a direction orthogonal to the direction of the flow of the intake air. The plurality of holes in different sizes that are arranged along the direction of the flow of the intake air and arranged along the direction orthogonal to the direction of the flow of the intake air further facilitate turbulence to perform atomization.

According to the fifth embodiment of the invention, holes in different sizes are arranged alternately. Alternate arrangement of the holes in different sizes further facilitates turbulence to perform atomization.

According to the sixth embodiment of the invention, holes are throttle holes, each of the holes having a narrower passage cross-sectional area on one side. The throttle holes, each of the holes having the narrower passage cross-sectional area on one side, change a flow rate of the intake air and further facilitate turbulence to perform atomization.

According to the seventh embodiment of the invention, each of the throttle holes is composed of a larger-diameter passage portion and a smaller-diameter passage portion. Since each of the throttle holes is composed of the larger-diameter passage portion and the smaller-diameter passage portion, a diameter of the passage varies to change the flow rate of the intake air to thereby further facilitate turbulence to perform atomization.

According to the eighth embodiment of the invention, each of the throttle holes has a larger-diameter passage gradually tapering toward a smaller-diameter passage. Since each of the throttle holes has the larger-diameter passage gradually tapering toward the smaller-diameter passage, a diameter of the passage varies to change the flow rate of the intake air to thereby further facilitate turbulence to perform atomization.

According to the ninth embodiment of the invention, throttle sides of the throttle holes are arranged alternately on one side and the other side of the plate. The throttle sides of the throttle holes arranged alternately on one side and the other side of the plate further facilitate turbulence to perform atomization.

According to the tenth embodiment of the invention, each of the holes in the first embodiment is a through hole having a uniform passage cross-sectional area. The through holes, each of the holes having the uniform passage cross-sectional area, change the flow rate of the intake air to thereby further facilitate turbulence to perform atomization.

According to the eleventh embodiment of the invention, holes are larger on the upstream side and smaller on the downstream side. Since the holes are larger on the upstream side and smaller on the downstream side, turbulence is further facilitated to perform atomization on the upstream side, and blowing back of the air-fuel mixture can be prevented on the downstream side.

According to the twelfth embodiment of the invention, a plurality of plates having a plurality of holes are positioned on an upstream side and a downstream side along a direction of the flow of the intake air, and arranged at different mounting angles from each other. The velocity of the flow of the intake air is not reduced irrespective of the mounting orientation of the intake passage to thereby further improve the atomization ratio of the air-fuel mixture, combustion efficiency and fuel economy, and to reduce the harmful components in the exhaust gas.

According to the thirteenth embodiment of the invention, a plurality of plates having a plurality of holes are integrally formed of one plate. Since the plurality of plates are integrated, the plates can easily be produced and mounted into the intake passage.

According to the fourteenth embodiment of the invention, a plate having a plurality of holes is provided to intake means disposed in the intake passage. A plate provided to the intake means such as a reed valve and a piston valve further facilitates turbulence, and the atomized air-fuel mixture is directly supplied to a primary compression chamber for the intake air of a crank chamber to thereby improve the combustion efficiency and fuel economy. Moreover, by preventing blowing back, the fuel component in the atomized air-fuel mixture remains as liquid drops in the holes of the plate, and the residual air-fuel mixture is supplied during the next intake stroke to thereby further improve the combustion efficiency and to reduce the harmful components in the exhaust gas.

According to the fifteenth embodiment of the invention, a plate having a plurality of holes is provided to an insulator disposed in the intake passage. The insulator disposed in the intake passage and provided with the plate having the plurality of holes completely intercepts blowing-back air-fuel mixture. As a result, the fuel component in the atomized air-fuel mixture remains as liquid drops in the holes of the plate, and the residual air-fuel mixture is supplied during the next intake stroke to thereby further improve the combustion efficiency and to reduce the harmful components in the exhaust gas.

BRIEF DESCRIPTION OF THE DRAWINGS

FIGS. 7(a) to 7(c) are drawings showing another embodiment of a plate having a plurality of holes.

DETAILED DESCRIPTION OF THE INVENTION

Figure 1:
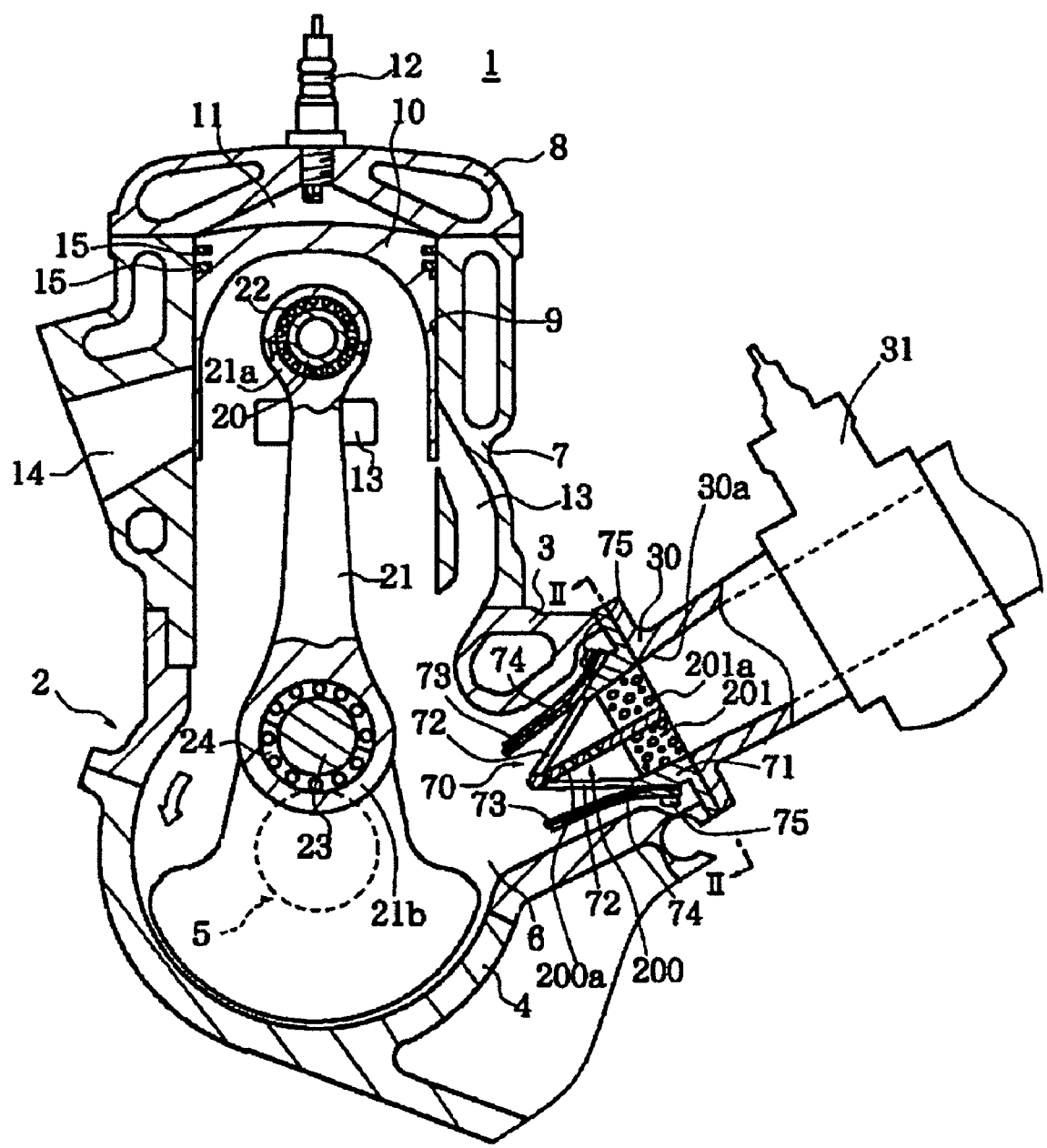
FIG. 1 is a vertical sectional view of a two-cycle engine having an intake device.
Figure 2:
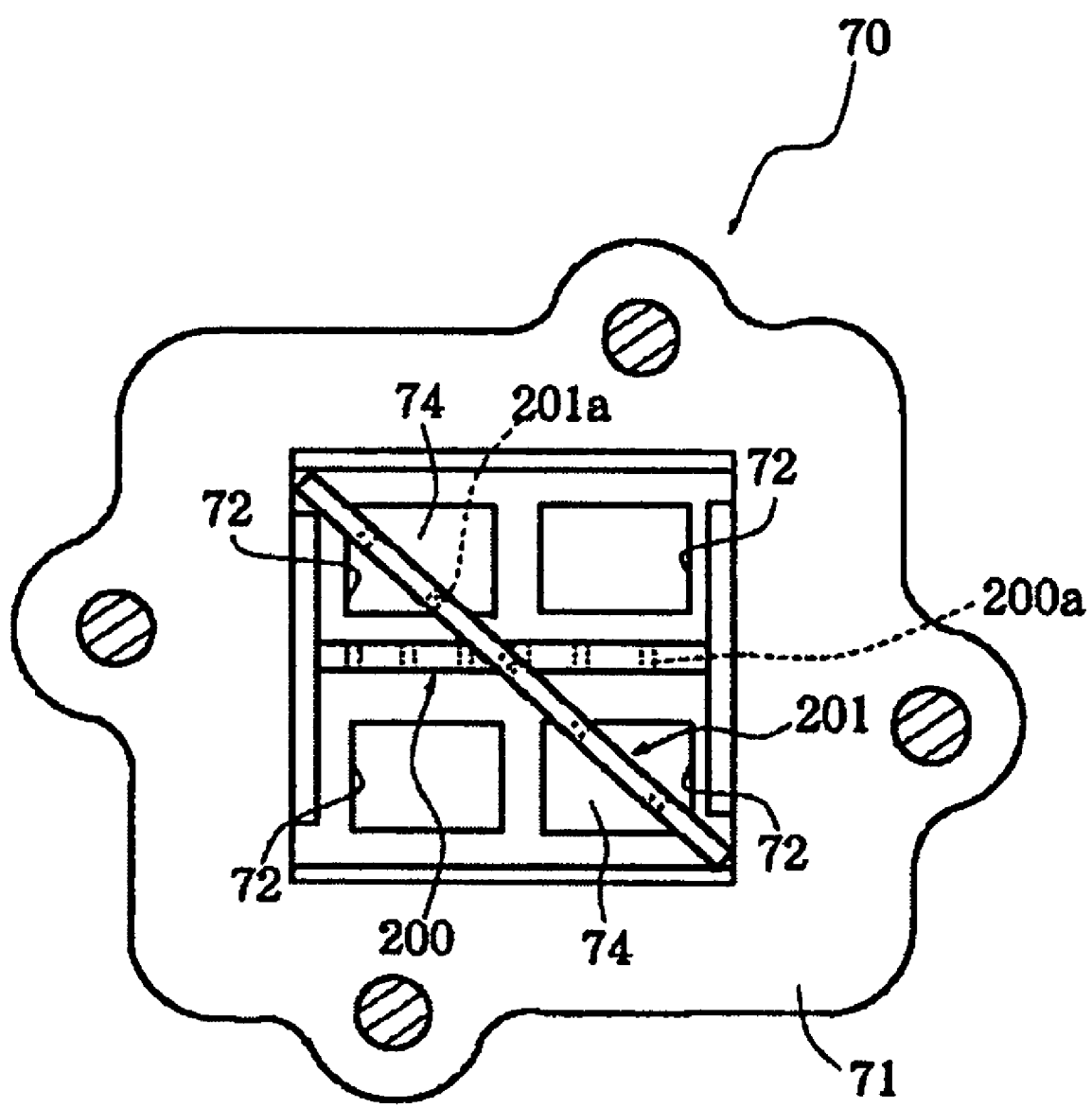
FIG. 2 is a sectional view taken along a line II-II in FIG. 1.
Figure 3:
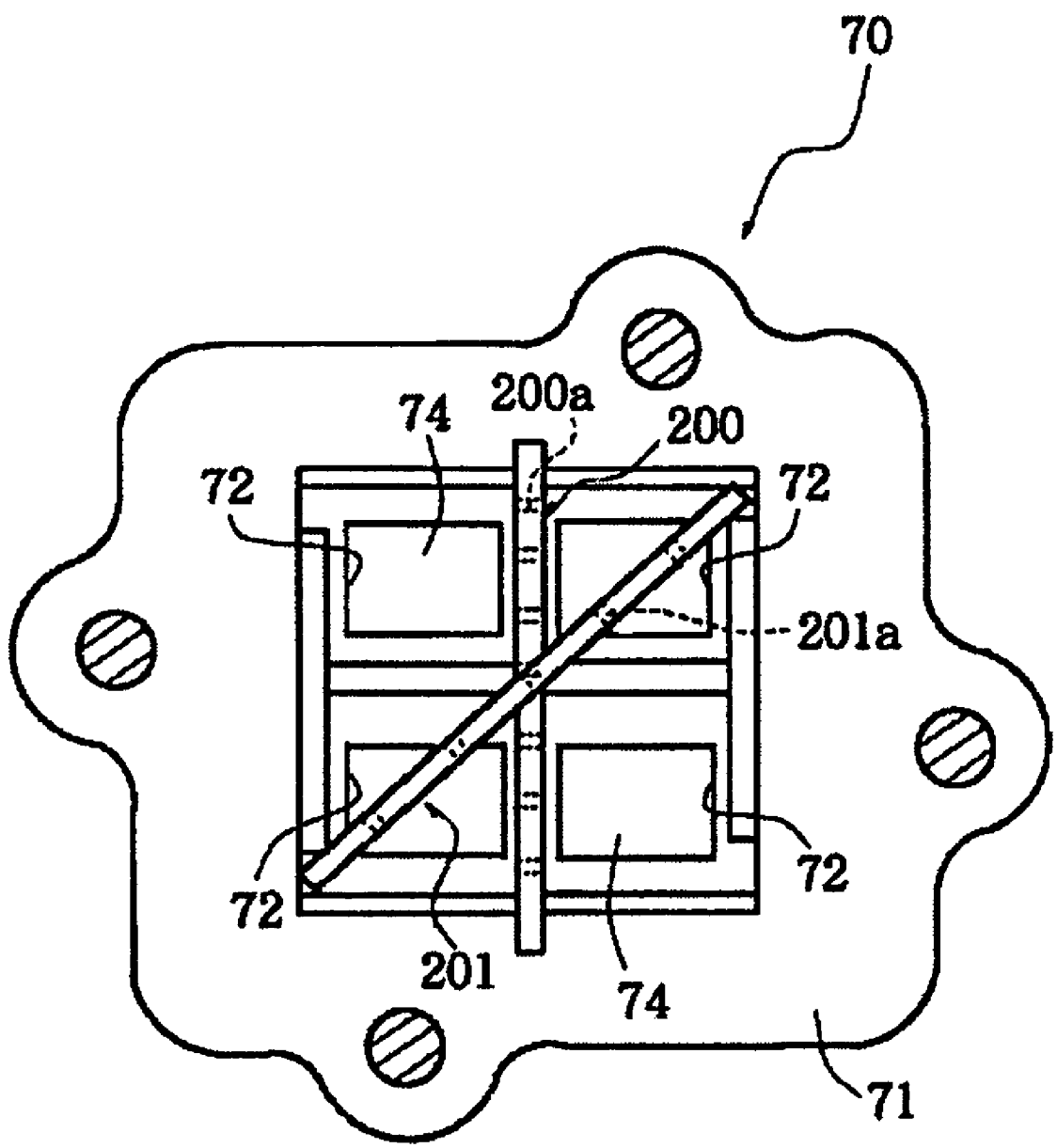
FIG. 3 is a drawing showing an embodiment of another arrangement of a plate having a plurality of holes.

Embodiments of an intake device for an engine according to the invention will be described below based on the drawings. FIGS. 1 to 3 show the embodiment applied to a two-cycle engine. FIG. 1 is a vertical sectional view of the two-cycle engine having the intake device. FIG. 2 is a sectional view taken along a line II-II of the backside in FIG. 1. FIG. 3 is a drawing showing another arrangement of a plate having a plurality of holes.

This two-cycle engine 1 includes a crankcase 2 composed of an upper case 3 and a lower case 4. Between the upper case 3 and the lower case 4, a crankshaft 5 is axially supported to be rotatable. The upper case 3 and the lower case 4 form a crank chamber 6.

A cylinder block 7 is mounted to the upper case 3 and a cylinder head 8 is mounted to the cylinder block 7. In a cylinder 9 formed in the cylinder block 7, a piston 10 is provided to enable reciprocation. A combustion chamber 11 is formed among the cylinder 9, a head of the piston 10, and the cylinder head 8. A spark plug 12 is attached to the cylinder head 8 in order to face the combustion chamber 11. Formed in the cylinder block 7 are three scavenging passages 13 for connecting the crank chamber 6 and the combustion chamber 11 during a scavenging stroke and an exhaust passage 14 for exhausting exhaust gas from the combustion chamber 11 during an exhaust stroke. Out of three scavenging passages 13, two scavenging passages 13 are disposed to face each other in a radial direction of the cylinder 9 and the rest of the scavenging passages 13 is disposed to face the exhaust passage 14 between the two opposed scavenging passages 13.

Two piston rings 15 are provided to an upper portion of the piston 10. On a piston pin 20 provided to the piston 10, a smaller end 21a of a connecting rod 21 is rotatably supported through a bearing 22 and a larger end 21b of the connecting rod 21 is supported on a crankpin 23 of the crankshaft 5 through a bearing 24. By this connecting rod 21, reciprocation of the piston 10 is converted into rotary movement and transmitted to the crankshaft 5.

An intake pipe 30 is mounted to the upper case 3 of the crankcase 2 through a reed valve 70, and a carburetor 31, which is a fuel supply system, is connected to the intake pipe 30. In the reed valve 70, an inlet 72 is formed in a body 71 and a valve 73 for opening and closing the inlet 72, and a valve stopper 74 are fastened together by using screws 75. The valve 73 of the reed valve 70 is opened during the intake stroke in which there is a negative pressure in the crank chamber 6, and the air-fuel mixture is drawn from an intake passage 30a of the intake pipe 30. In this way, the reed valve 70 permits only a flow of intake air from the intake pipe 30 toward the crank chamber 6, and the crank chamber 6 is used as a primary compression chamber for the intake air.

In the reed valve 70 disposed in the intake passage 30a on a downstream side of the carburetor 31 as the fuel supply system, a plurality of plates 200, 201 having a plurality of holes 200a, 201a in different sizes, are positioned on upstream and downstream sides along a direction of the flow of the intake air and arranged at different mounting angles from each other. The plurality of plates 200, 201 are made of metal such as aluminum and stainless steel or carbon material, and the plurality of holes 200a, 201a in different sizes are formed by blanking or cutting.

The downstream plate 200 is in such a position as to face the inlet 72 of the reed valve 70, and the upstream plate 201 is mounted at a different angle to cross the downstream plate 200 at an angle of about 45° as shown in FIG. 2.

Because the plurality of plates 200, 201 are positioned on the upstream and downstream sides along the direction of the flow of the intake air and arranged at different mounting angles from each other as described above, a flow rate of the intake air is not reduced irrespective of a mounting orientation of the intake passage 30a to thereby further improve an atomization ratio of the air-fuel mixture, combustion efficiency and fuel consumption, and to reduce harmful components in the exhaust gas, e.g., carbon monoxide (CO), hydrocarbons (HC), and nitrogen oxides (NOx).

In the present embodiment, the two upstream and downstream plates 200 and 201 that are formed integrally of one plate can be produced easily, and can be mounted in the intake passage 30a easily.

The fuel supplied by the carburetor 31 as described above is mixed with air. However, when the valve 73 of the reed valve 70 opens to draw air through the inlet 72, the plurality of holes 200a, 201a in different sizes on the plurality of plates 200, 201 further facilitate turbulence to perform atomization. The air-fuel mixture atomized in two steps and having a stable specific gravity is supplied to the crank chamber 6 to thereby improve the combustion efficiency and fuel consumption. Furthermore, a fuel component in the air-fuel mixture drawn during the primary compression remains as liquid drops in the holes 200a, 201a having different sizes on the plurality of plates 200, 201, and the residual air-fuel mixture is supplied during the next intake stroke to thereby further improve the fuel consumption.

The plurality of plates 200, 201 having the plurality of holes 200a, 201a in different sizes are provided in the reed valve 70 disposed in the intake passage 30a. The plurality of plates 200, 201 further facilitate the turbulence to perform the atomization. The atomized air-fuel mixture is directly supplied to the primary compression chamber for the intake air of the crank chamber 6 to thereby improve the combustion efficiency and the fuel consumption, and to reduce the harmful components in the exhaust gas, e.g., carbon monoxide (CO), hydrocarbons (HC), and nitrogen oxides (NOx).

The plurality of plates 200, 201 having the plurality of holes 200a, 201a in different sizes may be disposed in the reed valve 70. In this way, the plurality of plates 200, 201 can be increased in size, and the number of holes 200a, 201a in different sizes can be increased to thereby produce the turbulence more effectively to atomize the air-fuel mixture.

In the present embodiment, the plurality of plates 200, 201 are arranged parallel to the flow of the air-fuel mixture. However, the plates 200, 201 may be arranged to be orthogonal to the flow of the air-fuel mixture or may be arranged at predetermined inclination angles with respect to the flow of the air-fuel mixture.

In an embodiment in FIG. 3, the downstream plate 200 is in such a position as to be orthogonal to the inlet 72 of the reed valve 70, and the upstream plate 201 crosses the downstream plate 200 at an angle of about 45° to have a different mounting angle. Thus, the flow rate of the intake air is not reduced irrespective of the mounting orientation of the intake passage 30a to thereby further improve an atomization ratio of the air-fuel mixture.

Next, the holes 200a, 201a formed in the plurality of plates 200, 201 and having different sizes will be described below. The holes 200a formed in the plate 200 and having different sizes will be described. Since the holes 201a formed in the plate 201 have the same structures, description of them will be omitted.

Figure 4:
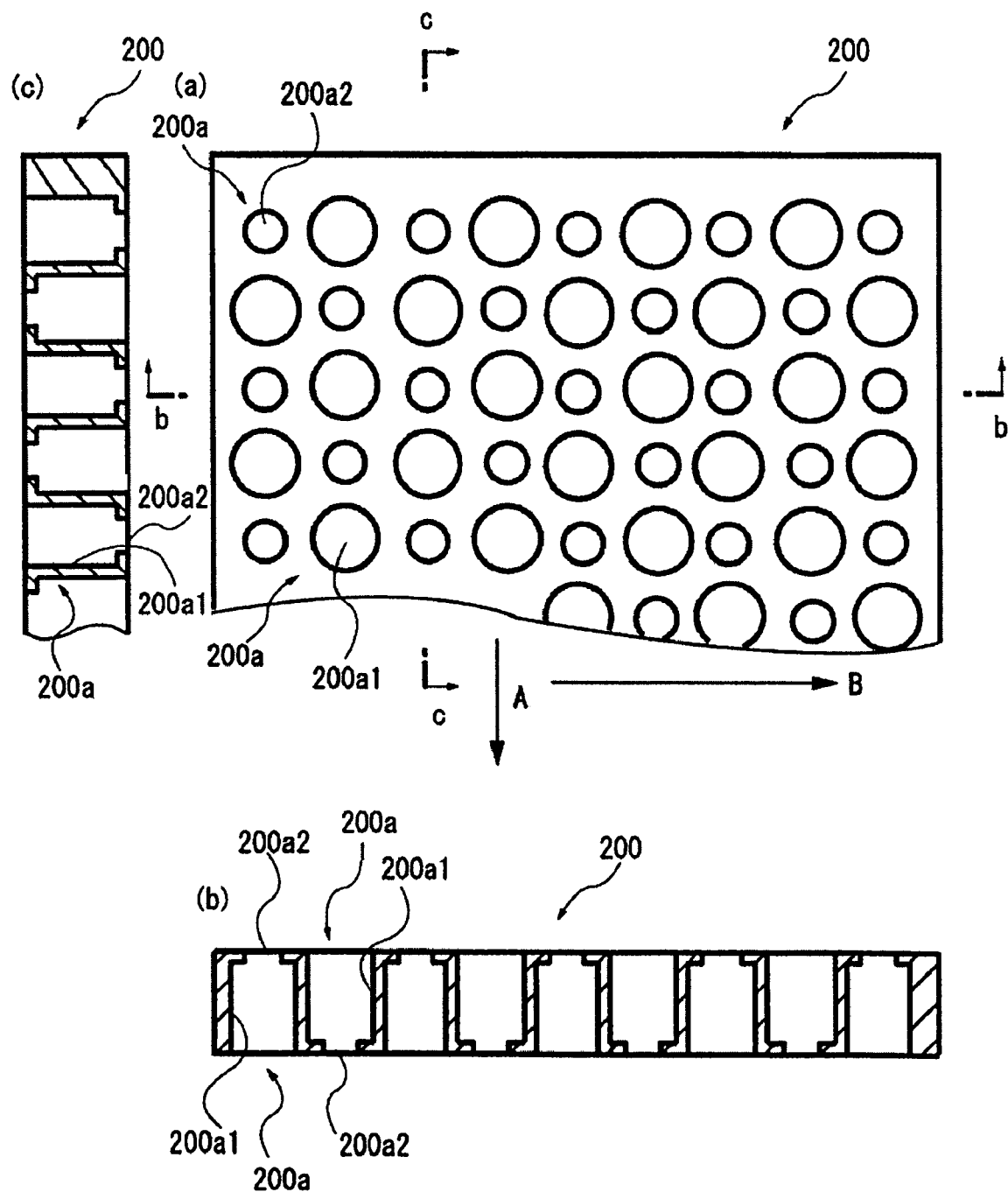
FIGS. 4(a) to 4(c) are drawings showing another embodiment of a plate having a plurality of holes.

The holes 200a having different sizes on the plate 200 of an embodiment in FIGS. 4(a) to 4(c) will be described. FIG. 4(a) is a plan view of a portion of the plate, FIG. 4(b) is a sectional view taken along a line b-b in FIG. 4(a), and FIG. 4(c) is a sectional view taken along a line c-c in FIG. 4(a).

The plurality of holes 200a in different sizes are arranged along a direction A of the flow of the intake air and along a direction B orthogonal to the flow of the intake air. The holes 200a having different sizes are arranged alternately. Each of the holes 200a having different sizes is a throttle hole having a narrower passage cross-sectional area on one side. In the present embodiment, the hole 200a is composed of a larger-diameter passage portion 200a1 and a smaller-diameter passage portion 200a2. The smaller-diameter passage portions 200a2 of the throttle sides are arranged alternately on one side and the other side of the plate 200.

As described above, each of the holes 200a having different sizes is the throttle hole, is composed of the larger-diameter passage portion 200a1 and the smaller-diameter passage portion 200a2, and has a varying passage diameter, which changes flow rates of the intake air passing through the holes 200a having different sizes to thereby further facilitate turbulence to perform atomization.

Figure 5:
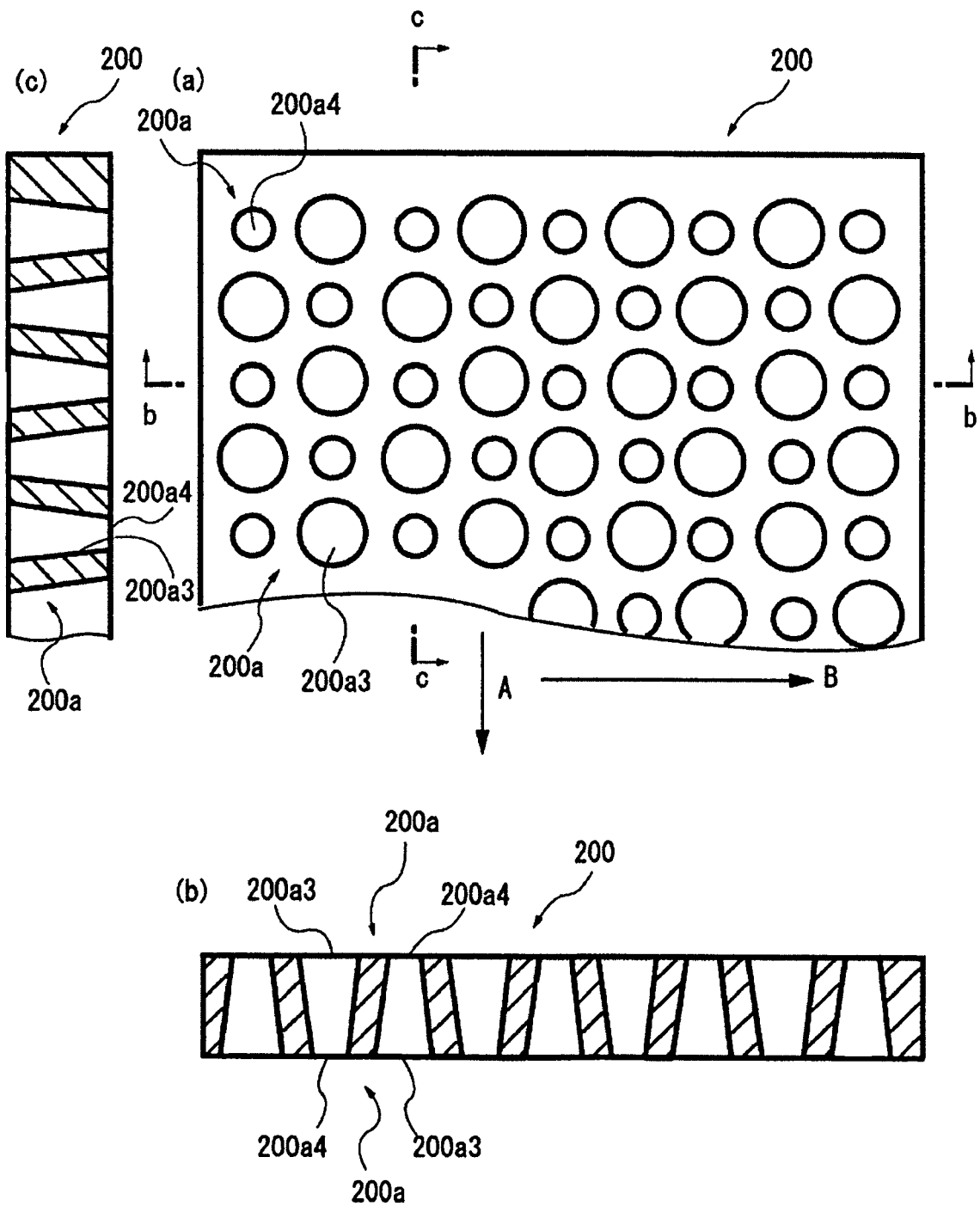
FIGS. 5(a) to 5(c) are drawings showing another embodiment of a plate having a plurality of holes.

The holes 200a having different sizes on the plate 200 of an embodiment in FIGS. 5(a) to 5(c) will be described. FIG. 5(a) is a plan view of a portion of the plate, FIG. 5(b) is a sectional view taken along a line b-b in FIG. 5(a), and FIG. 5(c) is a sectional view taken along a line c-c in FIG. 5(a).

The plurality of holes 200a in different sizes are arranged along the direction A of the flow of the intake air and along the direction B orthogonal to the direction of the flow of the intake air. The holes 200a having different sizes are arranged alternately. Each of the holes 200a having different sizes is a throttle hole having a narrower passage cross-sectional area on one side. In the present embodiment, a larger-diameter passage 200a3 of the hole 200a gradually tapers toward a smaller-diameter passage 200a4. The smaller-diameter passages 200a4 of the throttle sides are arranged alternately on one side and the other side of the plate 200.

As described above, each of the holes 200a having different sizes is the throttle hole with its larger-diameter passage portion 200a3 gradually tapering toward its smaller-diameter passage portion 200a4, and has a varying passage diameter which changes flow rates of the intake air passing through the holes 200a having different sizes to thereby facilitate turbulence to perform atomization.

Figure 6:
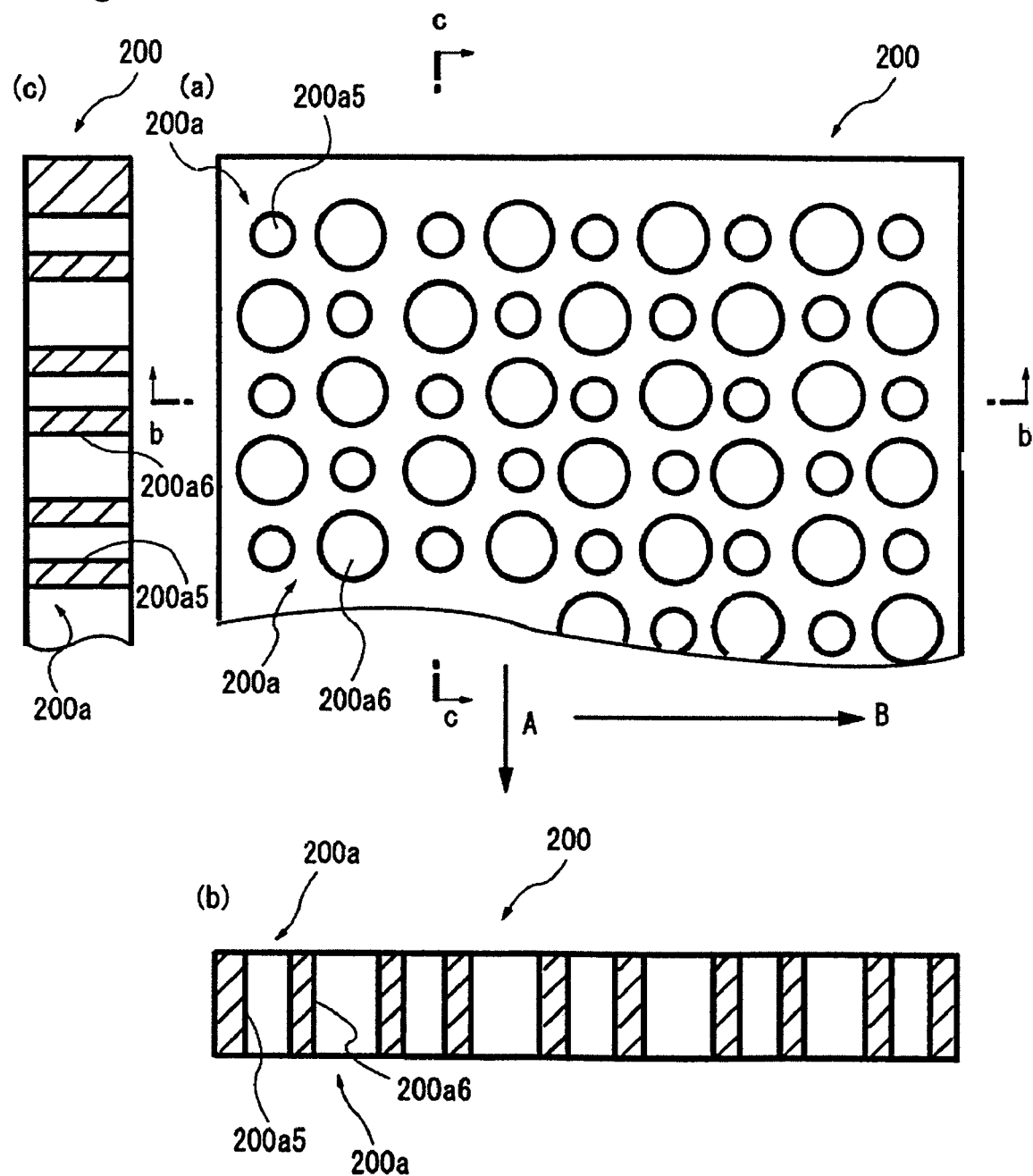
FIGS. 6(a) to 6(c) are drawings showing another embodiment of a plate having a plurality of holes.

The holes 200a having different sizes on the plate 200 of an embodiment in FIGS. 6(a) to 6(c) will be described. FIG. 6(a) is a plan view of a portion of the plate, FIG. 6(b) is a sectional view taken along a line b-b in FIG. 6(a), and FIG. 6(c) is a sectional view taken along a line c-c in FIG. 6(a).

The plurality of holes 200a in different sizes are arranged along the direction A of the flow of the intake air and along the direction B orthogonal to the flow of the intake air. The holes 200a having different sizes are arranged alternately. Each of the holes 200a having different sizes is a through hole having a uniform passage cross-sectional area, and the holes 200a are formed of smaller-diameter through holes 200a5 and larger-diameter through holes 200a6. The holes 200a having different sizes change flow rates of the intake air to thereby further facilitate turbulence to perform atomization.

The holes 200a having different sizes on the plate 200 of an embodiment in FIGS. 7(a) to 7(c) will be described. FIG. 7(a) is a plan view of a portion of the plate, FIG. 7(b) is a sectional view taken along a line b-b in FIG. 7(a), and FIG. 7(c) is a sectional view taken along a line c-c in FIG. 7(a).

The present embodiment has the similar structure to the embodiment shown in FIGS. 4(a) to 4(c), but the plurality of holes 200a having different sizes are larger on the upstream side and smaller on the downstream side. Because the plurality of holes 200a having different sizes are larger on the upstream side and smaller on the downstream side, turbulence is further facilitated on the upstream side and blowing back of the air-fuel mixture can be prevented on the downstream side.

In the embodiments in FIG. 4(a) to FIG. 7(c), the plurality of holes 200a, having different sizes, which are arranged along the direction A of the flow of the intake air and along the direction B orthogonal to the direction of the flow of the intake air further facilitate turbulence to perform atomization. However, the plurality of holes 200a having different sizes may be arranged only along the direction A of the flow of the intake air or only along the direction B orthogonal to the direction of the flow of the intake air.

As described above, in the invention, the plates 200, 201 having the plurality of holes 200a, 201a in different sizes further facilitate turbulence to perform atomization and prevent blowing back. As a result, the fuel component in the air-fuel mixture remains as liquid drops in the holes 200a, 201a on the plates 200, 201, and the residual air-fuel mixture is supplied during the next intake stroke. Further, the air-fuel mixture atomized in the two steps is supplied to thereby improve the combustion efficiency and fuel consumption, and to reduce the harmful components in the exhaust gas.

Figure 8:
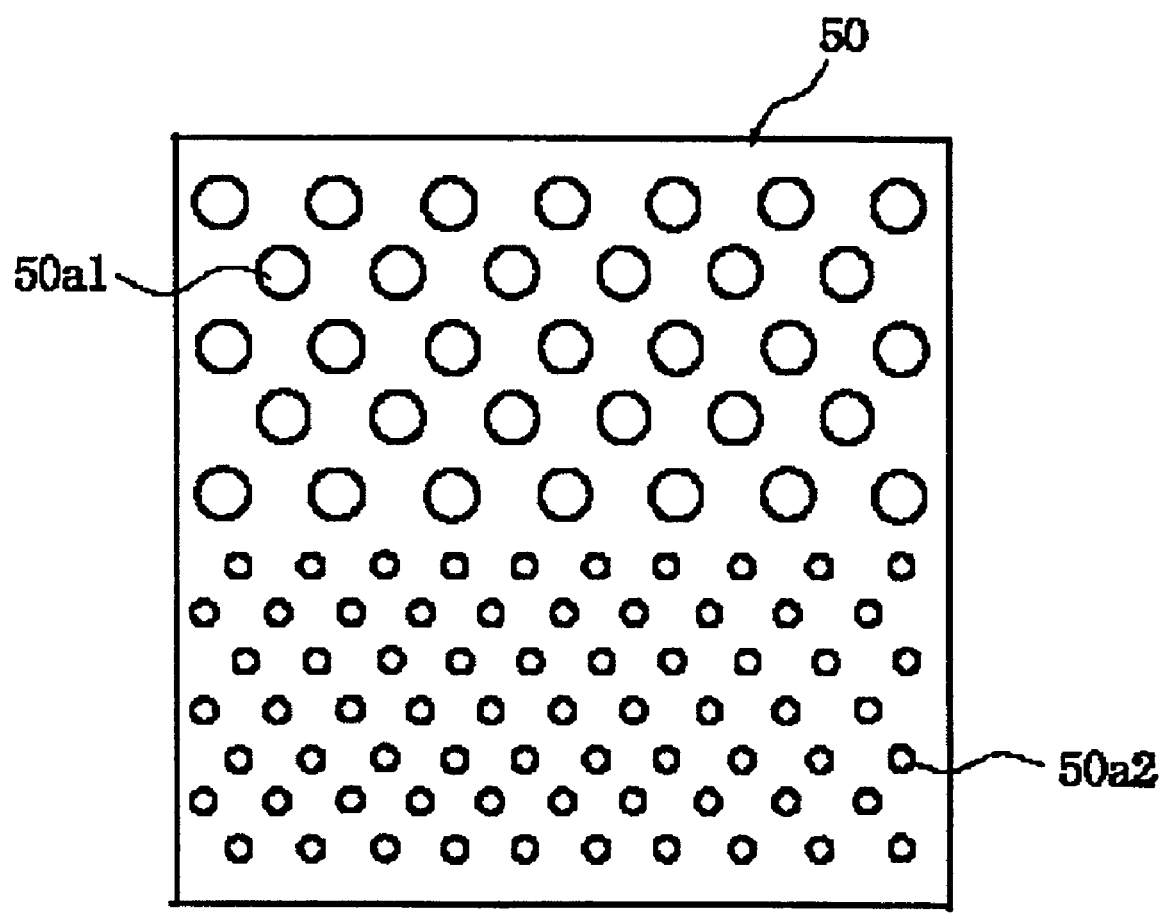
FIG. 8 is a drawing showing another embodiment of a plate having a plurality of holes.

In an embodiment in FIG. 8, the plurality of holes on a plate 50 are formed of large holes 50a1 on the upstream side and small holes 50a2 on the downstream side which are in different sizes from each other. In other words, the upstream holes 50a1 have larger diameters than the downstream holes 50a2, and such a difference in diameter of the holes further facilitates turbulence on the upstream side to perform atomization and prevents blowing back on the downstream side. In this way, the blowing-back air-fuel mixture is intercepted and remains as liquid drops in the downstream holes 50a2, and the residual air-fuel mixture is supplied during the next intake stroke. The air-fuel mixture atomized in two steps is supplied to thereby improve the combustion efficiency and fuel economy, and to reduce harmful components in the exhaust gas.

Figure 9:
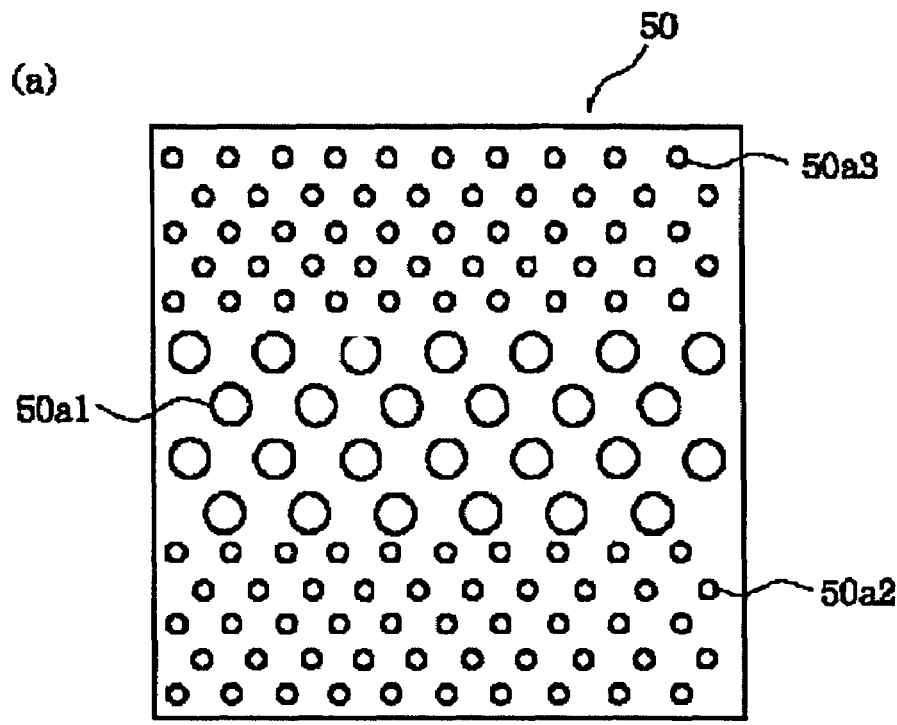
FIGS. 9(a) and 9(b) are drawings showing another embodiment of a plate having a plurality of holes.
Figure 9:
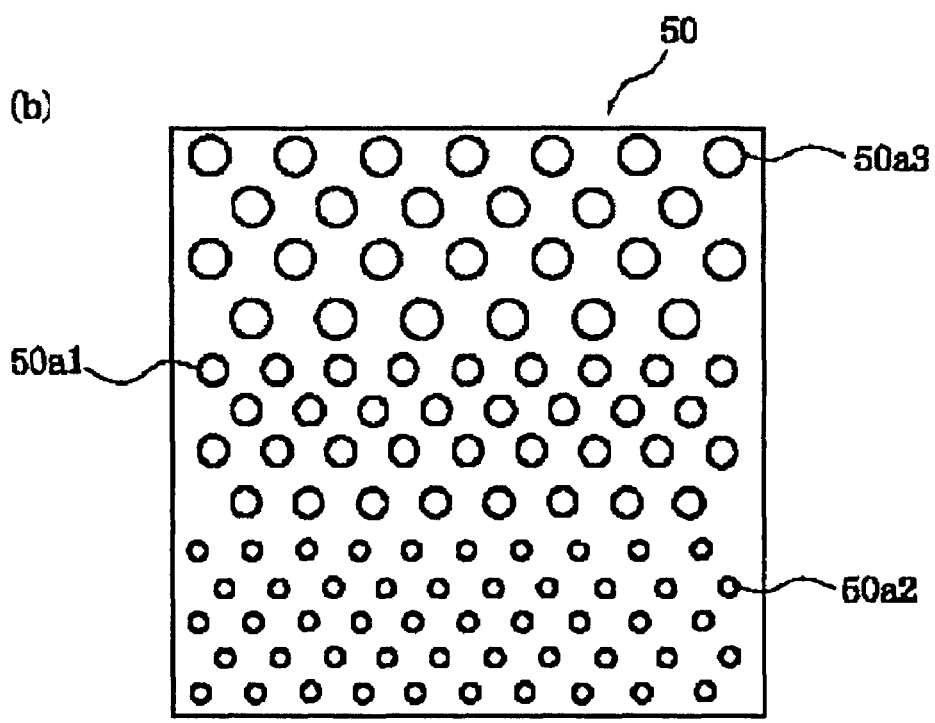

In an embodiment in FIGS. 9(a) and 9(b), FIG. 9(a) shows a case in which holes 50a3 on the most upstream side of the plate 50 are small, the upstream holes 50a1 are large, and the downstream holes 50a2 are small. In other words, the upstream holes 50a1 have larger diameters than the holes 50a3 on the most upstream side and the downstream holes 50a2 on the plate 50. FIG. 9(b) shows a case in which the holes 50a3 on the most upstream side have larger diameters, the upstream holes 50a1 have large diameters, and the downstream holes 50a2 have smaller diameters on the plate 50. Thus, it is possible to generate turbulence more efficiently to atomize the air-fuel mixture to thereby improve the combustion efficiency and fuel economy, and to reduce the harmful components in the exhaust gas.

Figure 10:
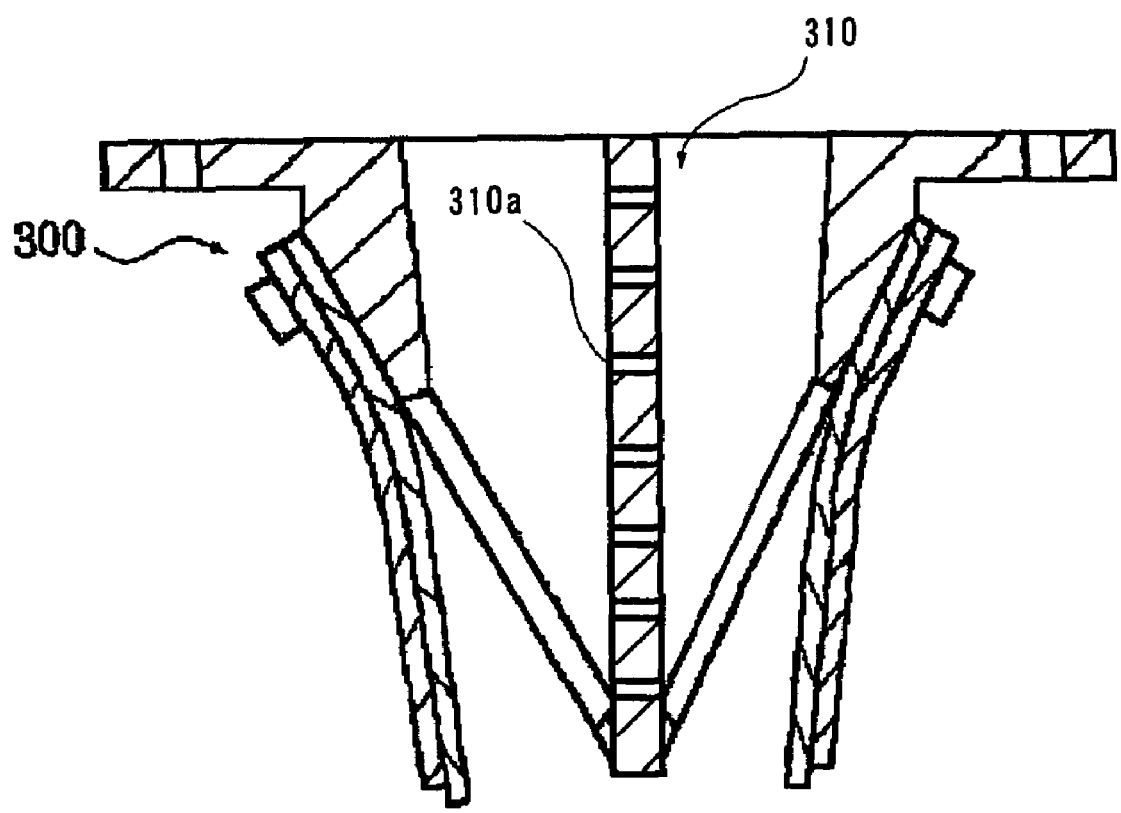
FIG. 10 is a sectional view showing an embodiment of a reed valve.

FIG. 10 is a sectional view showing another embodiment of the reed valve. Inside the reed valve 300 of this embodiment, a plate 310 is disposed. The plate 310 has the plurality of holes 310a in different sizes, and these holes 310a in different sizes are formed as shown in FIG. 4(a) to 9(b).

Figure 11:
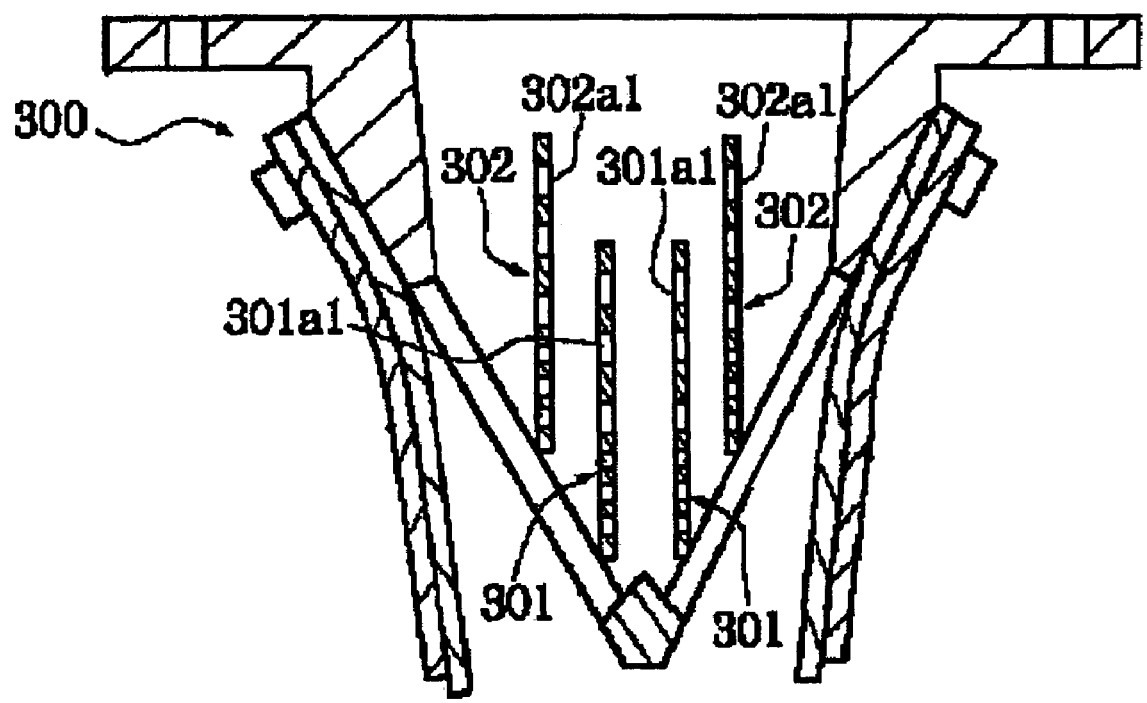
FIG. 11 is a sectional view showing another embodiment of a reed valve.

FIG. 11 is a sectional view showing another embodiment of the reed valve. Inside the reed valve 300 of this embodiment, two center plates 301 and two outer plates 302 on outer sides of the center plates 301 are arranged. The two center plates 301 are deviated downstream from the outer plates 302. The two center plates 301 have the plurality of holes 301a1 in different sizes, and two outer plates 302 likewise have the plurality of holes 302a1 in different sizes. These holes 310a in different sizes are formed as shown in FIGS. 4(a) to 9(b).

Figure 12:
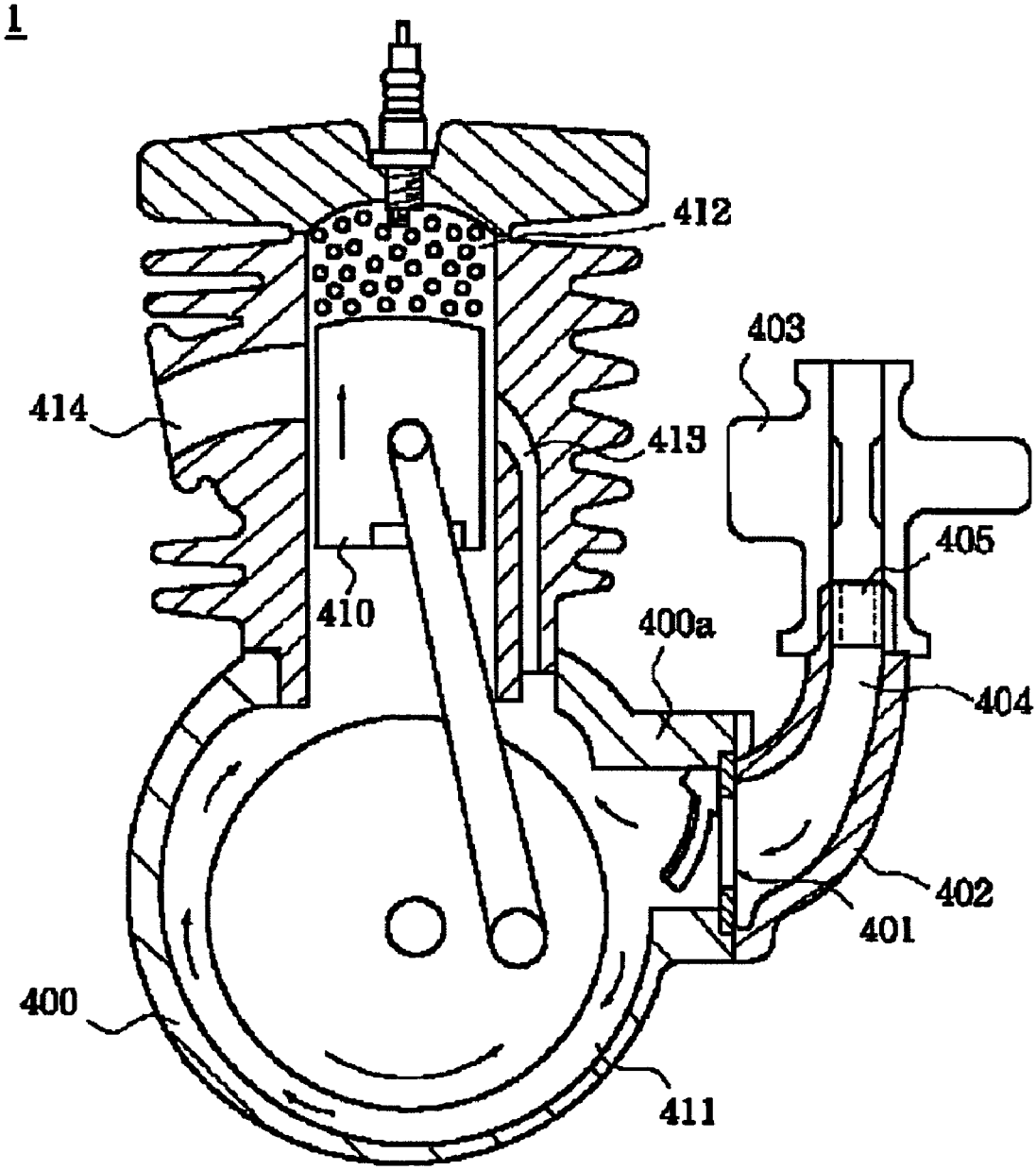
FIG. 12 is a vertical sectional view showing an embodiment applied to a two-cycle engine.

FIG. 12 is a vertical sectional view showing another embodiment applied to a two-cycle engine. In the two-cycle engine 1 of this embodiment, a reed valve 401 is mounted in an intake air inlet portion 400a of a crankcase 400, and a carburetor 403 which is a fuel supply system is connected to the intake air inlet portion 400a through an intake pipe 402. In an intake passage 404 on a downstream side of the carburetor 403, a plate 405 having holes in different sizes is disposed, and a clearance is formed between an outside of the cylindrical plate 405 and an inner wall of the intake passage 404.

In the two-cycle engine 1 of this embodiment, the reed valve 401 opens during a compression stroke in which a piston 410 moves up, and the air-fuel mixture enters a crank chamber 411 and is burnt in a combustion chamber 412. The reed valve 401 closes during a scavenging stroke in which the piston 410 moves down, the air-fuel mixture in the crank chamber 411 is compressed and supplied through a scavenging passage 413 to the combustion chamber 412, and exhaust gas is exhausted from an exhaust passage 414. In this embodiment, the cylindrical plate 405 having the plurality of holes in different sizes on the carburetor 403 generates turbulence to perform atomization and intercepts the air-fuel mixture blowing back to the clearance between the outside of the cylindrical plate 405 and the inner wall of the exhaust passage 414. As a result, the air-fuel mixture remains as liquid drops in the cylindrical plate 405, and the residual air-fuel mixture is supplied during the next intake stroke to thereby further improve the combustion efficiency.

Figure 13:
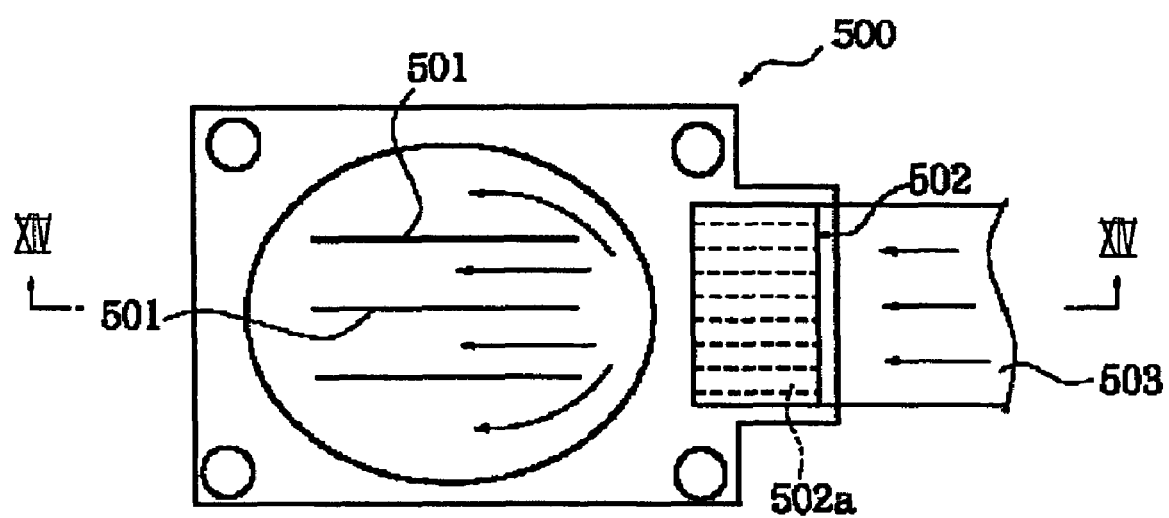
FIG. 13 is a front view of an insulator.
Figure 14:
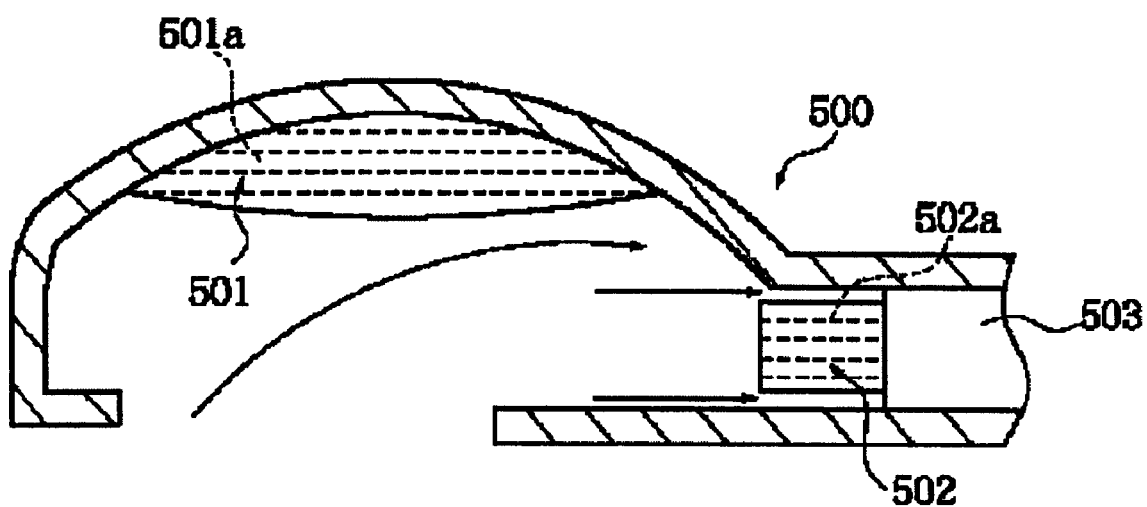
FIG. 14 is a sectional view taken along a line XIV-XIV in FIG. 13.

FIGS. 13 and 14 show an embodiment of an insulator disposed in an intake system of the two-cycle engine. FIG. 13 is a front view of the insulator and FIG. 14 is a sectional view taken along a line XIV-XIV in FIG. 13.

In the insulator 500 of this embodiment, a plurality of ribs 501 having the plurality of holes 501a in different sizes are formed on a downstream side, and a cylindrical plate 502 having the plurality of holes 502a in different sizes is disposed on an upstream side. A clearance is formed between an outside of the cylindrical plate 502 and an inner wall of an exhaust passage 503. The ribs 501 are arranged along a flow of the intake air, and the upstream and downstream holes 501a of the ribs 501 may be different in size from each other. The upstream and downstream holes 502a of the cylindrical plate 502 may be different in size from each other. The holes 501a of the ribs 501 and the holes 502a of the cylindrical plate 502 may be different in size from each other.

With the insulator 500 of this embodiment, the air-fuel mixture is atomized by the cylindrical plate 502, and the atomized air-fuel mixture is divided uniformly by the ribs 501 and mixed into a reed valve chamber. Therefore, it is possible to improve the combustion efficiency and the fuel economy, and to reduce the harmful components in the exhaust gas, e.g., carbon monoxide (CO), hydrocarbons (HC), and nitrogen oxides (NOx). Moreover, due to the blowing-back air-fuel mixture, the air-fuel mixture remains as liquid drops between the ribs 501. Furthermore, it is possible to completely intercept the air-fuel mixture blowing back into between the outside of the cylindrical plate 502 and the exhaust passage 503. As a result, the air-fuel mixture remains as liquid drops on the cylindrical plate 502, and the residual air-fuel mixture is supplied during the next intake stroke to thereby further improve the combustion efficiency.

Figure 15:
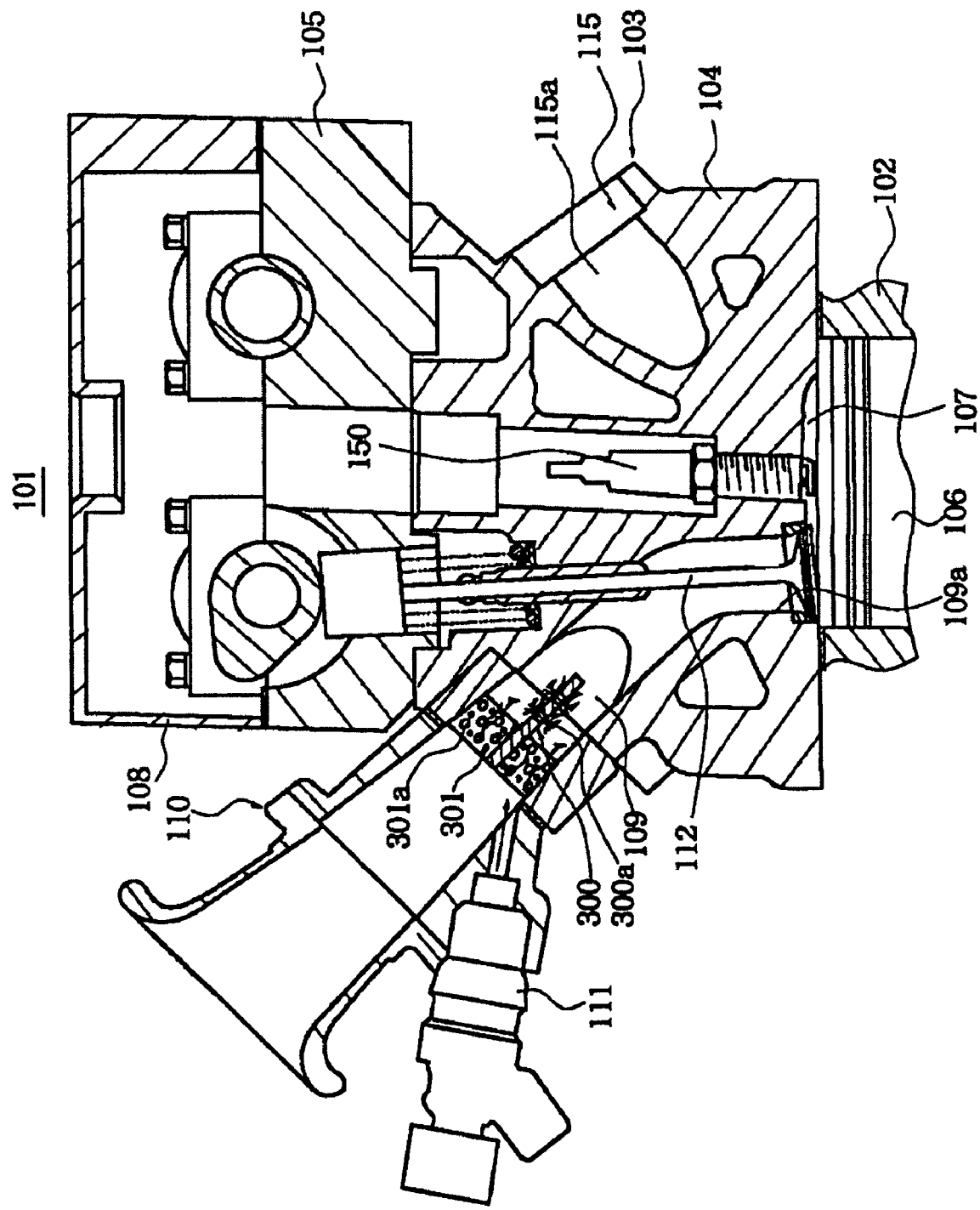
FIG. 15 is a vertical sectional view of a four-cycle engine having an intake device.

Next, an embodiment applied to a four-cycle engine will be described. FIG. 15 is a vertical sectional view of the four-cycle engine having the intake device.

In the present embodiment, a cylinder head 103 is mounted to a cylinder block 102 of the four-cycle engine 101 having a plurality of cylinders, and the cylinder head 103 is composed of a head lower portion 104 and a head upper portion 105. The head lower portion 104 and a piston 106 fitted in the cylinder block 102 form a combustion chamber 107, and a head cover 108 is mounted to the head upper portion 105. An intake passage 109 is formed in the head lower portion 104 and opens into the combustion chamber 107 through three branch passages 109a.

In each of the branch passages 109a of the intake passage 109, an intake vale 112 opens and closes to thereby supply the air-fuel mixture to the combustion chamber 107. In the head lower portion 104, an exhaust passage 115 is formed and is open in the combustion chamber 107 through a pair of branch passages 115a. In each of the branch passages 115a, an exhaust valve (not shown) opens and closes to thereby exhaust the exhaust gas from an exhaust pipe (not shown) connected to the exhaust passage 115.

An intake pipe 110 is connected to the intake passage 109. An injector 111, which is a fuel supply system, is provided in the intake pipe 110 to inject fuel with predetermined timing. A spark plug 150 is mounted to the head lower portion 104 to face the combustion chamber 107.

In the intake passage 109 on a downstream side of the injector 111 as the fuel supply system, a plurality of plates 300, 301 having a plurality of holes 300a, 301a are positioned on an upstream side and a downstream side along a direction of a flow of intake air, and are arranged at different mounting angles from each other.

The fuel supplied by the injector 111 is mixed with air. The plurality of plates 300, 301 having the plurality of holes 300a, 301a further facilitate turbulence to atomize the mixture. The air-fuel mixture atomized in two steps is supplied to thereby improve the combustion efficiency and fuel consumption. Furthermore, a fuel component in the atomized air-fuel mixture remains as liquid drops in the holes 300a, 301a having different sizes on the plurality of plates 300, 301, and the residual air-fuel mixture is supplied during the next intake stroke to thereby further improve the combustion efficiency.

A flow rate of the intake air is not reduced irrespective of a mounting orientation of the intake passage 109 to thereby further improve an atomization ratio of the air-fuel mixture, combustion efficiency and fuel consumption, and to reduce harmful components in the exhaust gas, e.g., carbon monoxide (CO), hydrocarbons (HC), and nitrogen oxides (NOx).

What is claimed is:

1. An intake device for an engine comprising:
    a fuel supply system for supplying fuel to an intake passage; and
    a plate having a plurality of holes, the plating being disposed along a direction of a flow of intake air in the intake passage on a downstream side of the fuel supply system and the holes being in different sizes,
    wherein the holes are throttle holes, each of the holes having a narrower passage cross-sectional area on one side, and each of the holes being composed of a larger-diameter passage portion and a small-diameter passportion, and
    wherein throttle sides of the throttle holes are arranged alternately on one side and the other side of the plate.

* * * * *